US012631476B2

(12) United States Patent
Long et al.

(10) Patent No.: US 12,631,476 B2
(45) Date of Patent: May 19, 2026

(54) OPTICAL SENSOR READOUT AND INTERROGATING AN OPTICAL SENSOR

(71) Applicant: Government of the United States of America, as represented by the Secretary of Commerce, Gaithersburg, MD (US)

(72) Inventors: David Alexander Long, Bethesda, MD (US); Jason John Gorman, Silver Spring, MD (US); Thomas Warren LeBrun, Washington, DC (US); Benjamin James Reschovsky, Cabin John, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 169 days.

(21) Appl. No.: 18/144,787

(22) Filed: May 8, 2023

(65) Prior Publication Data

US 2023/0358575 A1     Nov. 9, 2023

Related U.S. Application Data

(63) Continuation-in-part of application No. PCT/US2021/058643, filed on Nov. 9, 2021.

(Continued)

(51) Int. Cl.
*G01D 5/353* (2006.01)
*G01B 9/02001* (2022.01)

(52) U.S. Cl.
CPC ..... *G01D 5/35306* (2013.01); *G01B 9/02008* (2013.01)

(58) Field of Classification Search
CPC .......... G01D 5/35306; G01D 5/35354; G01D 5/35341; G01D 5/35309; G01B 9/02008;
(Continued)

(56) References Cited

FOREIGN PATENT DOCUMENTS

RU        2684937 C2 *   4/2019   ............... G01J 3/45

OTHER PUBLICATIONS

D. A. Long et al., "Electro-optic frequency combs for rapid interrogation in cavity optomechanics", Aug. 14, 2020, Cornell University Library (Year: 2020).*

(Continued)

*Primary Examiner* — Tarifur R Chowdhury
(74) *Attorney, Agent, or Firm* — Office of Chief Counsel for National Institute of Standards and Technology

(57)        ABSTRACT

An optical sensor readout Interrogates an optical sensor and includes: a microcavity sensor that receives an optical frequency comb, produces a post-sensor optical frequency comb from the optical frequency comb based on a physical perturbation subjected to the microcavity sensor, and communicates the post-sensor optical frequency comb to a photo detector; an electro optic modulator in optical communication with the microcavity sensor and that receives input light and a radiofrequency drive signal, produces the optical frequency comb from the input light based on the radiofrequency drive signal, and communicates the optical frequency comb to the microcavity sensor; and the photo detector in optical communication with the microcavity sensor and that: receives the post-sensor optical frequency comb from the microcavity sensor; receives frequency shifted light; and produces a radiofrequency interferogram from interference between the post-sensor optical frequency comb and the frequency shifted light.

20 Claims, 10 Drawing Sheets

Related U.S. Application Data

(60) Provisional application No. 63/111,115, filed on Nov. 9, 2020, provisional application No. 63/110,678, filed on Nov. 6, 2020.

(58) Field of Classification Search
CPC .......... G02B 2006/12142; G05G 2009/04759; G01H 9/004
See application file for complete search history.

(56) References Cited

OTHER PUBLICATIONS

R.W.P. Drever et al, "Laser phase and frequency stabilization using an optical resonator," Jun. 1983 Appl. Phys. B 31, 97-105.*

Hebert, N.B., et al., "Self-heterodyne interference spectroscopy using a comb generated by pseudo-random modulation", Optics Express, 2015, p. 27806-27818, vol. 23 No. 21.

Long, D.A., et al., "Multiplexed sub-Doppler spectroscopy with an optical frequency comb", Physical Review A, 2016, p. 061801, vol. 94.

Long, D.A., et al., "Electro-optic frequency combs for rapid interrogation in cavity optomechanics", Optics Letters, 2021, p. 645-648.

Roy, J., et al., "Continuous real-time correction and averaging for frequency comb interferometry", Optics Express, 2012, p. 21932-21939, vol. 20 No. 20.

Hebert, N.B., et al., "Dual-comb spectroscopy with a phase-modulated probe comb for sub-MHz spectral sampling", Optics Letters, 2016, p. 2282-2285, vol. 41 No. 10.

Long, D.A., et al., "Electro-optic frequency combs generated via direct digital synthesis applied to sub-Doppler spectroscopy", OSA Continuum, 2019, p. 3576-3583, vol. 2 No. 12.

Picque, N., et al., "Frequency comb spectroscopy", Nature Photonics, 2019, p. 146-157, vol. 13.

International Search Report from PCT/US2021/058643 file date Nov. 9, 2021.

* cited by examiner (A)

(B)

(A)

(B)

OPTICAL SENSOR READOUT AND INTERROGATING AN OPTICAL SENSOR

CROSS REFERENCE TO RELATED APPLICATIONS

This application is a U.S. National Phase Application of PCT/US2021/058643 (filed Nov. 9, 2021), which claims the benefit of U.S. Provisional Patent Application Ser. No. 63/110,678 (filed Nov. 6, 2020); and claims the benefit of U.S. Provisional Patent Application Ser. No. 63/111,115 (filed Nov. 9, 2020), each of which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is an optical sensor readout for interrogating an optical sensor, the optical sensor readout comprising: a microcavity sensor that receives an optical frequency comb, produces a post-sensor optical frequency comb from the optical frequency comb based on a physical perturbation subjected to the microcavity sensor, and communicates the post-sensor optical frequency comb to a photo detector; an electro optic modulator in optical communication with the microcavity sensor and that receives input light and a radiofrequency drive signal, produces the optical frequency comb from the input light based on the radiofrequency drive signal, and communicates the optical frequency comb to the microcavity sensor; and the photo detector in optical communication with the microcavity sensor and that: receives the post-sensor optical frequency comb from the microcavity sensor; receives frequency shifted light; and produces a radiofrequency interferogram from interference between the post-sensor optical frequency comb and the frequency shifted light, such that the radiofrequency interferogram includes information to determine the physical perturbation subjected to the microcavity sensor.

Disclosed is a process for interrogating an optical sensor with an optical sensor readout, the process comprising: receiving, by a microcavity sensor, an optical frequency comb; producing, by the microcavity sensor, a post-sensor optical frequency comb from the optical frequency comb; optionally subjecting the microcavity sensor to a physical perturbation and changing a resonant condition of the microcavity sensor in response to the physical perturbation; communicating the post-sensor optical frequency comb from the microcavity sensor to a photo detector; an electro optic modulator in optical communication with the microcavity sensor receiving, by an electro optic modulator, input light and a radiofrequency drive signal; producing, by the electro optic modulator, the optical frequency comb from the input light based on the radiofrequency drive signal; communicating the optical frequency comb from the electro optic modulator to the microcavity sensor; the photo detector in optical communication with the microcavity sensor and that: receiving, by the photo detector, the post-sensor optical frequency comb from the microcavity sensor; receiving, by the photo detector, frequency shifted light; and producing, by the photo detector, a radiofrequency interferogram from interference between the post-sensor optical frequency comb and the frequency shifted light, such that the radiofrequency interferogram includes information to determine the physical perturbation subjected to the microcavity sensor.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
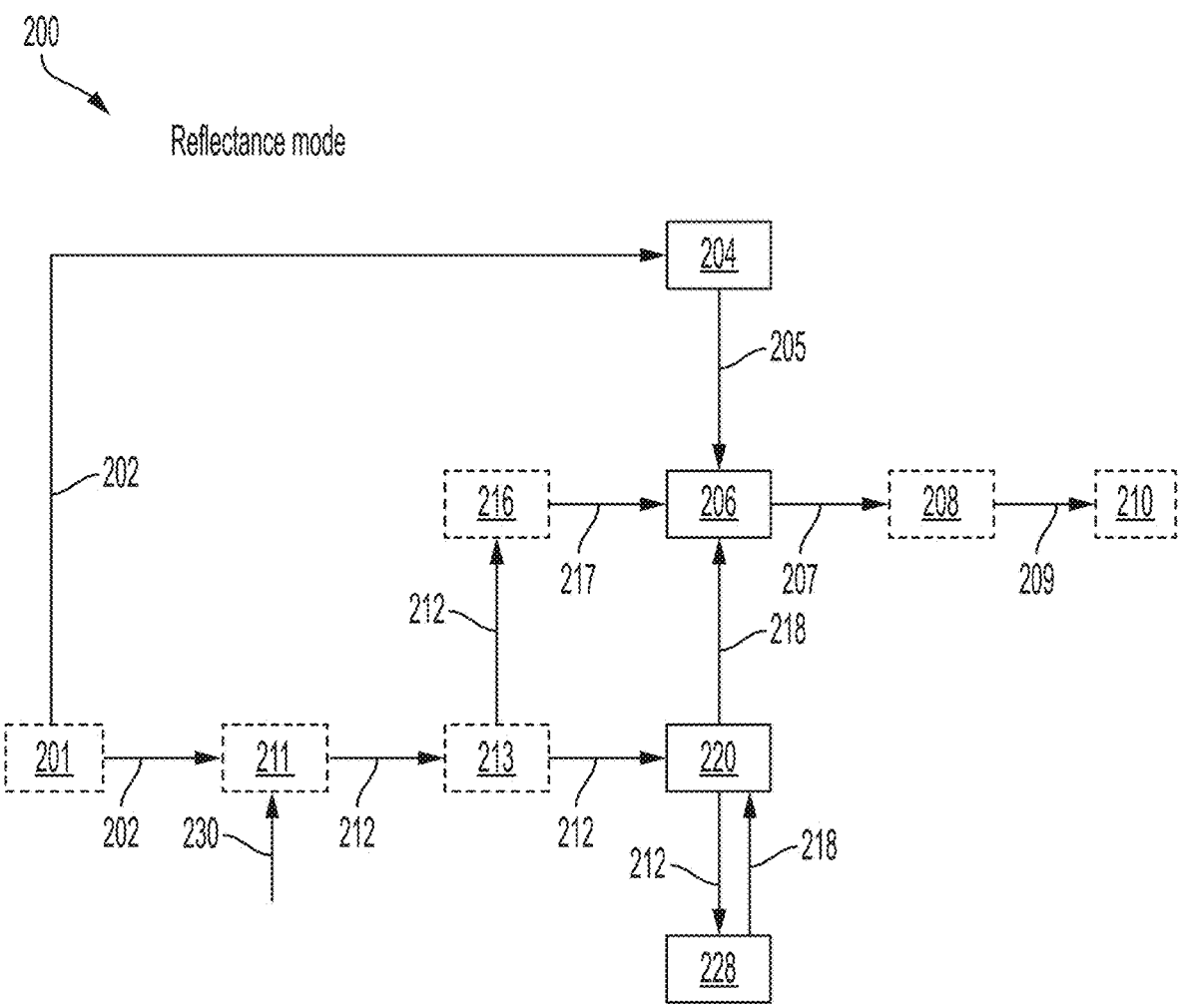
FIG. 1 shows an optical sensor readout configured in a reflectance mode, according to some embodiments.

A detailed description of one or more embodiments is presented herein by way of exemplification and not limitation.

A variety of optomechanical sensors have been developed for determining physical quantities such as acceleration, pressure, force, and temperature. Some of these sensors are based on cavities that involve optical resonances that shift in the presence of an excitation of interest. To readout signals of conventional optical sensors, the optical resonance shift can be measured, which is conventionally done by scanning the laser frequency of a tunable laser, by a heterodyne measurement in conjunction with a closed-loop feedback system, or operating the laser on the side of a resonance so that frequency shifts are converted to laser intensity shifts. However, these techniques are limited by slow measurement bandwidth, limited dynamic range, or fragility of the device with respect to its operating conditions.

Optical frequency combs are used to measure optical spectra of chemical or atomic samples. Optical combs based on electro-optic modulators (EOMs) have advantages over other optical techniques that include extremely dense comb tooth spacing (<=100 Hz), tunable comb parameters (e.g., comb span or tooth spacing), the ability for agile, digital control of these parameters, or power level flatness between comb teeth. Advantageously, an optical sensor readout described herein includes EOM-based optical frequency combs to interrogate optical cavity-based sensors and to monitor the resonance shifts of such cavities.

The optical sensor readout provides fast measurement bandwidth (e.g., 500 kHz) and measurement of cavity resonance shifts (resulting from cavity length changes or refractive index changes) that are larger than the cavity linewidth. In absence of a laser lock, the optical sensor readout is more robust than some conventional methods and avoids bandwidth limitations associated with locking systems. Beneficially, the optical sensor readout produces an optical spectrum and not just a spectral location of an optical resonance so that the optical sensor readout can quantify at high bandwidth additional parameters such as cavity finesse, coupling strength into the optical sensor, or presence of additional cavity modes.

The optical sensor readout can include high-speed radiofrequency electronics to generate an EOM comb and can measure the resulting interferogram with post-processing of data.

It has been discovered that an electro-optic modulator-based optical frequency comb performs readout of optical sensors. Since the comb span and tooth spacing of these combs can be easily and rapidly tuned, interrogating an optical sensor with the optical frequency comb is applicable to a myriad of different optical sensors that involve various levels of optical frequency resolution, dynamic range, or measurement speed. Compared to conventional methods of measuring optical sensors, the optical sensor readout and interrogating an optical sensor with the optical sensor readout provides high bandwidth, large amplitude signals, and robust operation in an absence of including a laser frequency lock.

Figure 2:
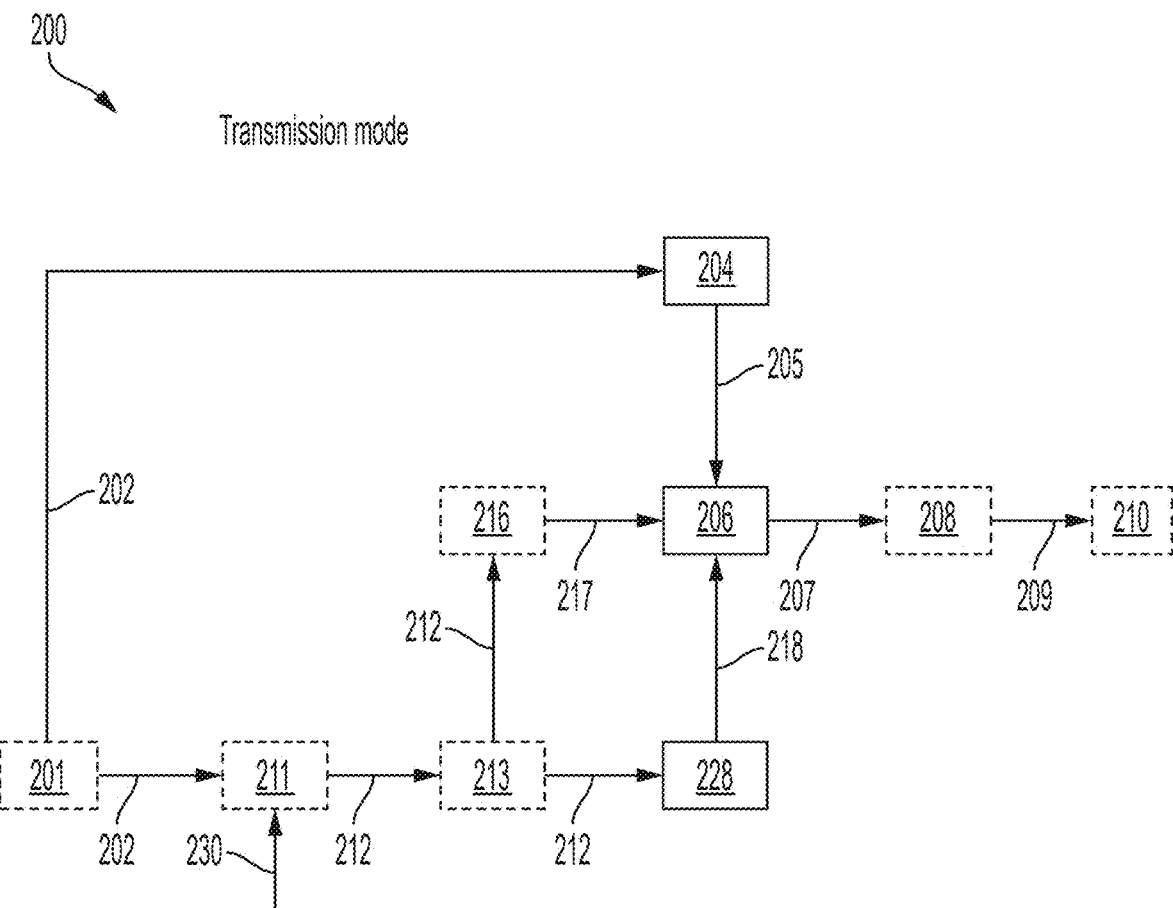
FIG. 2 shows an optical sensor readout configured in a transmission mode, according to some embodiments.

Optical sensor readout 200 interrogates an optical sensor. In an embodiment, with reference to FIG. 1 (a configuration for reflectance mode), FIG. 2 (a configuration for transmission mode), and FIG. 3, optical sensor readout 200 includes: a microcavity sensor 228 that receives an optical frequency comb 212, produces a post-sensor optical frequency comb 218 from the optical frequency comb 212 based on a physical perturbation subjected to the microcavity sensor 228, and communicates the post-sensor optical frequency comb 218 to a photo detector 206; an electro optic modulator 211 in optical communication with the microcavity sensor 228 and that receives input light 202 and a radiofrequency drive signal 230, produces the optical frequency comb 212 from the input light 202 based on the radiofrequency drive signal 230, and communicates the optical frequency comb 212 to the microcavity sensor 228; and the photo detector 206 in optical communication with the microcavity sensor 228 and that: receives the post-sensor optical frequency comb 218 from the microcavity sensor 228; receives frequency shifted light 205; and produces a radiofrequency interferogram 207 from interference between the post-sensor optical frequency comb 218 and the frequency shifted light 205, such that the radiofrequency interferogram 207 includes information to determine the physical perturbation subjected to the microcavity sensor 228.

In an embodiment, optical sensor readout 200 includes an acousto optic modulator 204 in optical communication with the photo detector 206 and that receives the input light 202, produces the frequency shifted light 205, and communicates the frequency shifted light 205 that is received by the photo detector 206.

In an embodiment, optical sensor readout 200 includes an optical attenuator 216 in optical communication with the photo detector 206 and that receives the optical frequency comb 212, produces attenuated optical frequency comb 217 from the optical frequency comb 212, and communicates the attenuated optical frequency comb 217. The attenuated optical frequency comb 217 is combined with the post-sensor optical frequency comb 218 from the microcavity sensor 228 to form probe light 219 that comprises the attenuated optical frequency comb 217 and the post-sensor optical frequency comb 218, and the probe light 219 is communicated to and received by the photo detector 206. In an embodiment, optical sensor readout 200 further includes an optical switch 213 in optical communication with the electro optic modulator 211, the optical attenuator 216, and the microcavity sensor 228 and that receives the optical frequency comb 212 from the electro optic modulator 211, and switches optical paths for propagation of optical frequency comb 212 to the optical attenuator 216 or to the microcavity sensor 228.

In an embodiment, optical sensor readout 200 includes a circulator 220 in optical communication with the photo detector 206 and the microcavity sensor 228 and that receives the optical frequency comb 212, communicates the optical frequency comb 212 to the microcavity sensor 228, receives the post-sensor optical frequency comb 218 from the microcavity sensor 228, and communicates the post-sensor optical frequency comb 218 from the microcavity sensor 228 to the photo detector 206.

In an embodiment, optical sensor readout 200 includes a laser 201 in optical communication with the electro optic modulator 211 and the acousto optic modulator 204 and that produces the input light 202 that is received by the electro optic modulator 211 and the acousto optic modulator 204.

In an embodiment, optical sensor readout 200 includes an amplifier 208 in communication with the photo detector 206 and that receives the radiofrequency interferogram 207 from the photo detector 206, produces a amplified radiofrequency interferogram 209 from the radiofrequency interferogram 207, and communicates the amplified radiofrequency interferogram 209 to a digitizer 210. In an embodiment, optical sensor readout 200 further includes a digitizer 210 in communication with the amplifier 208 and that receives the amplified radiofrequency interferogram 209 from the amplifier 208, and digitizes the amplified radiofrequency interferogram 209.

In an embodiment, the microcavity sensor 228 comprises a first cavity mirror 222 and a second cavity mirror 224. It is contemplated that the first cavity mirror 222 receives the post-sensor optical frequency comb 218 from the electro optic modulator 211 and communicates the post-sensor optical frequency comb 218 to a second cavity mirror 224 as intracavity light 223. The second cavity mirror 224 is in optical communication with the first cavity mirror 222 and receive the intracavity light 223. A portion of the intracavity light 223 is transmitted from microcavity sensor 228 to the photo detector 206 via cavity mirror 222 in a reflectance mode of microcavity sensor 228 or via cavity mirror 224 in a transmission mode of microcavity sensor 228. It should be appreciated that a resonance condition of the microcavity sensor 228 for producing the intracavity light 223 from the optical frequency comb 212 depends on the physical perturbation subjected to the microcavity sensor 228.

In an embodiment, optical sensor readout 200 includes a shaker 226 in mechanical communication with the microcavity sensor 228 that provides the physical perturbation to the microcavity sensor 228. Various modes of operation of shaker 226 can be used so that the external excitation of microcavity sensor 228 from shaker 226 can include vibration, acceleration, and the like. The physical perturbation can be sourced from external conditions such as from mounting on an object such as an inanimate object (e.g., vehicle, robot, building, and the like) or animal (e.g., human, rodent, and the like).

In some embodiments, optical switch 213 and optical attenuator 216 are included to acquire a comb spectrum of optical frequency comb 212 to use for normalization of post-sensor optical frequency comb 218 from microcavity sensor 228. Normalization also can be achieved by detuning laser 201 from the cavity resonance of microcavity sensor 228.

Various cavities for microcavity sensor 228 can be employed. In an embodiment, with reference to FIG. 3, the microcavity is configured with two mirrors (e.g., 222, 224) to form a Fabry-Perot cavity, but other optical resonator configurations can be used. As the physical perturbation is subjected to microcavity sensor 228, the microcavity is changed, and the cavity resonance shifts.

The optical frequency comb 212 can be selected to suit efficient readout of a selected microcavity sensor 228 or type of physical perturbation to which microcavity sensor 228 is subjected. In an embodiment, optical frequency comb 212 is the chirped optical frequency comb described in international patent application PCT/US21/58412.

Optical sensor readout 200 can be made of various elements and components that provide efficient generation and communication of electrical and optical signals. For optical components, coatings and materials used can be selected for operation with laser wavelengths that can include, e.g., visible light from 400 nm to 700 nm, near infrared light from 700 nm to 1000 nm, or short-wave infrared from 1000 nm to 3000 nm. Operation with selected laser wavelengths can provide integration with a large number of fiber optic components designed for various applications such as telecommunications, making optical sensor readout 200 scalable and compatible with off-the-shelf optical characterization tools.

Elements of optical sensor readout 200 can be made of materials that are physically or chemically resilient in an environment in which optical sensor readout 200 is disposed. Exemplary materials include a metal, ceramic, thermoplastic, glass, semiconductor, and the like. The elements of optical sensor readout 200 can be made of the same or different material and can be monolithic in a single physical body or can be separate members that are physically joined. Transmission of a selected wavelength of light can occur in free space or propagation through a condensed medium such a fiber optic or through optical windows, polarizers, and the like made of a material suitable for optical transmission at wavelengths included, e.g., in optical frequency comb 212 or post-sensor optical frequency comb 218.

Optical sensor readout 200 can be made in various ways. It should be appreciated that optical sensor readout 200 include a number of optical, electrical, or mechanical components, wherein such components can be interconnected and placed in communication (e.g., optical communication, electrical communication, mechanical communication, fluid communication, and the like) by electrical, physical, chemical, optical, or free-space interconnects. The components can be disposed on mounts that can be disposed on a bulkhead for alignment or physical compartmentalization. As a result, optical sensor readout 200 can be disposed in a terrestrial environment or space environment. Elements of optical sensor readout 200 can be formed from suitable materials such as semiconductor, ceramic, glass, metal, and the like. Moreover, elements of optical sensor readout 200 can be formed using custom additive or subtractive manufacturing as well as interconnection of commercially available components. Moreover, elements of optical sensor readout 200 can be formed using integrated photonic fabrication techniques and incorporated on a photonic integrated circuit.

Optical sensor readout 200 has numerous advantageous and unexpected benefits and uses. In an embodiment, a process for interrogating an optical sensor with optical sensor readout 200 includes: receiving, by a microcavity sensor 228, an optical frequency comb 212; producing, by the microcavity sensor 228, a post-sensor optical frequency comb 218 from the optical frequency comb 212; optionally subjecting the microcavity sensor 228 to a physical perturbation and changing a resonant condition of the microcavity sensor 228 in response to the physical perturbation; communicating the post-sensor optical frequency comb 218 from the microcavity sensor 228 to a photo detector 206; an electro optic modulator 211 in optical communication with the microcavity sensor 228 receiving, by an electro optic modulator 211, input light 202 and a radiofrequency drive signal 230; producing, by the electro optic modulator 211, the optical frequency comb 212 from the input light 202 based on the radiofrequency drive signal 230; communicating the optical frequency comb 212 from the electro optic modulator 211 to the microcavity sensor 228; the photo detector 206 in optical communication with the microcavity sensor 228 and that: receiving, by the photo detector 206, the post-sensor optical frequency comb 218 from the microcavity sensor 228; receiving, by the photo detector 206, frequency shifted light 205; and producing, by the photo detector 206, a radiofrequency interferogram 207 from interference between the post-sensor optical frequency comb 218 and the frequency shifted light 205, such that the radiofrequency interferogram 207 includes information to determine the physical perturbation subjected to the microcavity sensor 228.

In an embodiment, interrogating an optical sensor includes receiving, by an acousto optic modulator 204, the input light 202; producing, by the acousto optic modulator 204, the frequency shifted light 205; and communicating the frequency shifted light 205 from the acousto optic modulator 204 to the photo detector 206.

In an embodiment, interrogating an optical sensor includes receiving, by an optical attenuator 216, the optical frequency comb 212; producing, by the optical attenuator 216, attenuated optical frequency comb 217 from the optical frequency comb 212; communicating the attenuated optical frequency comb 217 from the optical attenuator 216; combining the attenuated optical frequency comb 217 with the post-sensor optical frequency comb 218 from the microcavity sensor 228 to form probe light 219 that comprises the attenuated optical frequency comb 217 and the post-sensor optical frequency comb 218; and communicating the probe light 219 to the photo detector 206. According to an embodiment, the process further includes receiving, by an optical switch 213, the optical frequency comb 212 from the electro optic modulator 211; and switching, by the optical switch 213, between optical paths for propagation of the optical frequency comb 212 to the optical attenuator 216 or to the microcavity sensor 228.

In an embodiment, interrogating an optical sensor includes receiving, by a circulator 220, the optical frequency comb 212; communicating, from the circulator 220, the optical frequency comb 212 to the microcavity sensor 228; receiving, by the circulator 220, the post-sensor optical frequency comb 218 from the microcavity sensor 228, and communicating the post-sensor optical frequency comb 218 from the microcavity sensor 228 to the photo detector 206.

In an embodiment, interrogating an optical sensor includes producing, by a laser 201, the input light 202; and communicating the input light 202 from the laser 201 to the electro optic modulator 211 and the acousto optic modulator 204.

In an embodiment, interrogating an optical sensor includes receiving, by an amplifier 208, the radiofrequency interferogram 207 from the photo detector 206; producing, by the amplifier 208, an amplified radiofrequency interferogram 209 from the radiofrequency interferogram 207; and communicating the amplified radiofrequency interferogram 209 from the amplifier 208 to a digitizer 210. In an embodiment, interrogating an optical sensor further includes receiving, by an digitizer 210, the amplified radiofrequency interferogram 209 from the amplifier 208; and digitizing, by the digitizer 210, the amplified radiofrequency interferogram 209.

In an embodiment, interrogating an optical sensor includes, wherein the microcavity sensor 228 comprises a first cavity mirror 222 and a second cavity mirror 224 in optical communication with the first cavity mirror 222: receiving, by the first cavity mirror 222, the post-sensor optical frequency comb 218 from the electro optic modulator 211; communicating the post-sensor optical frequency comb 218 from the first cavity mirror 222 to the second cavity mirror 224 as intracavity light 223; receiving, by the second cavity mirror 224, the intracavity light 223 from the first cavity mirror 222; and transmitting a portion of the intracavity light 223 is from the microcavity sensor 228 to the photo detector 206 via cavity mirror 222 in a reflectance mode of microcavity sensor 228 or via cavity mirror 224 in a transmission mode of microcavity sensor 228. Here, a resonance condition of the microcavity sensor 228 for producing the intracavity light 223 from the optical frequency comb 212 depends on the physical perturbation subjected to the microcavity sensor 228.

In an embodiment, interrogating an optical sensor includes providing, by a shaker 226 in mechanical communication with the microcavity sensor 228, the physical perturbation to the microcavity sensor 228.

Optical sensor readout 200 and interrogating an optical sensor with optical sensor readout 200 disclosed herein have numerous beneficial uses, including enabling optical sensors to be used in certain regimes (i.e., high bandwidth, large amplitude signals) in which conventional techniques fail or are technically deficient. Optical sensor readout 200 also avoids complications or problems with a laser frequency lock. Furthermore, optical sensor readout 200 and interrogating an optical sensor is flexible and can be applied to varied types of sensors. Optical sensor readout 200 and interrogating an optical sensor can be multiplexed and shared between multiple types of optical sensors to reduce cost and complexity of multi-sensor packages. Optical sensor readout 200 and interrogating an optical sensor provides absolute, calibration-free measurements.

The articles and processes herein are illustrated further by the following Example, which is non-limiting.

EXAMPLE

Electro-optic frequency combs were employed to rapidly interrogate an optomechanical sensor, wherein spectral resolution substantially exceeding that possible with a conventional mode-locked frequency comb. Frequency combs were generated using an integrated-circuit-based direct digital synthesizer and utilized in a self-heterodyne configuration. Unlike conventional approaches based upon laser locking, the optical sensor readout used here allows rapid, parallel measurements of full optical cavity modes, large dynamic range of sensor displacement, and acquisition across a wide frequency range between DC and 500 kHz. In addition to being suited to measurements of acceleration, the optical sensor readout can be used for interrogation in a wide range of cavity optomechanical sensors.

The measurement of optical resonance frequencies of cavity modes is involved in experiments with cavity optomechanical systems and can be achieved using an optical readout method based on laser frequency locking. These measurements determine the displacement of mechanical resonators, changes in a cavity's effective refractive index, and are used to investigate dispersive or dissipative optomechanical interactions [10]. While laser frequency locking is widely used for laser stabilization in macroscopic systems, it is less effective for the readout of micro- or nanoscale cavity optomechanical systems. Changes in cavity length due to the motion of an optomechanical resonator can cause frequency shifts that are large compared to the cavity linewidth, requiring wide frequency tuning of the locked laser. In addition, this frequency tuning must have high bandwidth in many cases in order to maintain the lock, such as when the optomechanical resonator has both high vibration amplitude and a high resonance frequency.

The combination of wide frequency tuning and high tuning bandwidth is not found in most stable single-frequency lasers. For example, external cavity diode lasers (ECDLs) may have sufficient tuning range but the piezoelectric actuators used to tune the wavelength typically have bandwidths well below the mechanical resonance frequencies found in many cavity optomechanical systems. Also, although current tuning can provide high bandwidth in these lasers, it offers insufficient tuning range.

In certain circumstances, fast Pound-Drever-Hall (PDH) laser locking with large tuning ranges can be achieved using external modulators, but these techniques have other challenges, such as the presence of extraneous sidebands or the need for precise stabilization of multiple bias voltages. In addition, the high-gain, large-bandwidth controllers that are required amplify electronic noise over a large frequency band and contribute to readout noise. Finally, the broad linewidths of microcavity optical resonances (generally hundreds of MHz or more) require large modulation frequencies, adding to the challenges of PDH locking.

Given these limitations in conventional laser technology, optical cavity readout with laser frequency locking can result in low feedback bandwidth or low laser tuning range, or both. This is particularly problematic for optomechanical sensors, where large range and bandwidth are essential for operation so new readout methods that can meet these performance requirements are essential.

The optical sensor readout for cavity readout does not require laser locking, feedback control, or precision frequency tuning of the laser. An optical frequency comb generated with an electro-optic phase modulator is used to detect the full spectrum of a single resonance of an optical cavity within an optomechanical system. By sampling this spectrum at a high rate, the center frequency of the cavity resonance can be measured as a function of time, thereby providing the change in length of the cavity. Because this method does not require precision frequency tuning of the laser or feedback electronics, it avoids the complexity and added controller noise of a fast-feedback system. Finally, very high dynamic range can be achieved by generating a wide frequency comb and the measurement range is limited only by the data acquisition and photodetector bandwidth, which can easily reach many GHz or more.

Results that were measured on an integrated cavity optomechanical sensor with the electro-optic frequency comb readout method are presented to demonstrate the effectiveness of the approach, including dynamic range, linearity, mechanical ring-down, noise floor, and cavity stability tests. Further, we note that the optical approach described herein is readily applicable to a wide range of optomechanical systems including many other types of physical and chemical sensors.

Figure 3:
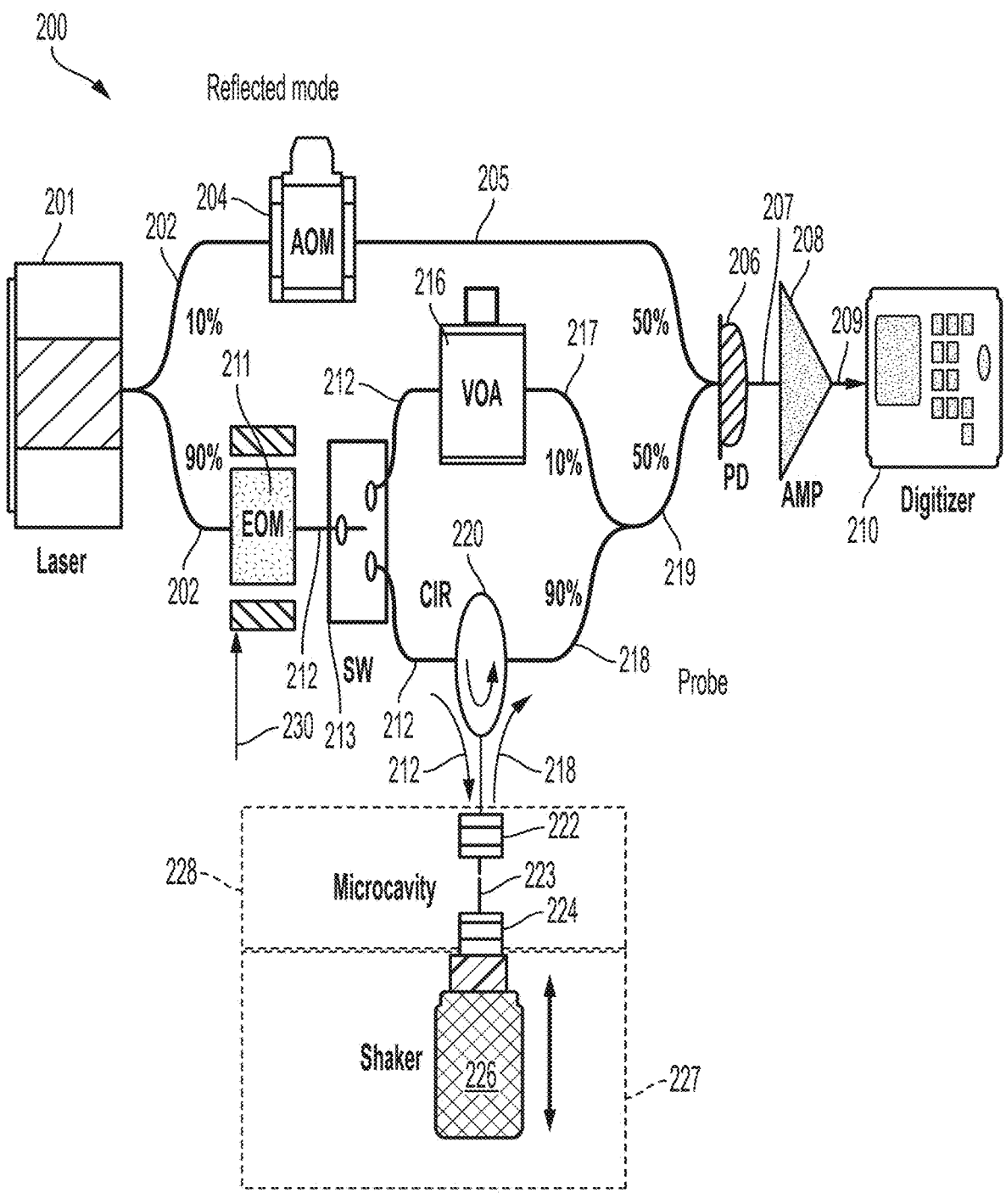
FIG. 3 shows an optical sensor readout configured in a reflectance mode, according to the Example, wherein the laser was a low-noise distributed feedback fiber laser.

The implementation of the electro-optic frequency comb readout method is described in FIG. 3. A frequency comb was produced by driving an electro-optic phase modulator with a repeating linear frequency chirp produced by a direct digital synthesizer (DDS) integrated circuit. The use of a constant amplitude, linear frequency chirp has been shown to be a nearly ideal approach for the generation of ultra-flat frequency combs. In addition, this approach allows for combs whose properties can be controlled in an agile, digital fashion with comb tooth spacings that can be set over six orders of magnitude between hundreds of Hz and hundreds of MHz.

The optical frequency comb can be generated in various ways. A DDS can generate a train of constant amplitude, linearly chirped waveforms that can span from 10 MHz to 1200 MHz with a widely tunable repetition period that was selected to be 100 ns in the presented measurements. This configuration produces an optical frequency comb that is centered at the carrier frequency of the laser and spans 2.4 GHz in width with a spacing of 10 MHz (i.e., the inverse of the repetition period). The comb span can be increased through the use of either cascaded modulators or nonlinear broadening. The optical frequency comb is sent to the optomechanical sensor through a fiber-optic circulator and observed in reflection.

A self-heterodyne architecture was employed to downconvert the reflected optical frequency comb from the sensor into the radio frequency domain. A second optical path serves as the local oscillator, which is combined on a photodiode with the optical frequency comb reflected from the optomechanical cavity. An acousto-optic modulator in the local oscillator path shifts the carrier tone by 51 MHz to ensure that positive- and negative-order comb teeth occur at unique frequencies in the radiofrequency domain. An optical switch is employed to normalize the resulting measurements by a spectrum recorded when bypassing the sensor. This normalization, which can be performed as infrequently as once per day, addresses minor deviations from a flat optical comb and electrical frequency-response curve. In order to avoid any potential damage to the cavity optomechanical sensor, the total optical power incident on the device was limited to a few hundred µW.

The electro-optic frequency comb readout method is ideally suited to dynamic, high amplitude changes in the cavity length where laser locking approaches are generally precluded. In order to demonstrate the capabilities of the method, it was applied to an integrated cavity optomechanical accelerometer. The optomechanical component of the accelerometer is composed of a mechanical resonator and silicon concave micromirror, both with high-reflectivity mirror coatings. The resonator and micromirror form a hemispherical optical cavity with a TEM00 mode that has a finesse of 5430, a cavity length of 375 µm, and a full-width at half-maximum linewidth of 73.7 MHz. The mechanical resonator has well-separated vibrational modes with a fundamental resonance located at 9.8 kHz. The accelerometer was packaged in a stainless-steel mount that facilitates fiber coupling of light into and out of the cavity and mounting to commercial shaker tables.

A typical electro-optic frequency comb after down conversion is shown in FIG. 1b. Continuous temporal interferograms with a length of 0.5 s were acquired at $3 \times 10^9$ samples per second and divided into 1 us sub-interferograms to be fast Fourier transformed (FFT) and normalized to generate reflection spectra of an individual sensor cavity mode. The resulting 500,000 cavity mode spectra were then individually fit using a Gaussian profile. After an initial fit to determine the other fit parameters (amplitude, width, and offset), each subsequent fit used the center frequency as the only free parameter to minimize fitting complexity.

A representative Gaussian fit can be seen in FIG. 1*c*, showing that the center frequency of the cavity mode can readily be quantified. A Gaussian profile was selected for computational efficiency as more advanced profiles led to similar results. This entire processing procedure, including reading/writing data files, Fourier transformation, normalization, and fitting, takes approximately 30 s on a desktop computer using a parallel architecture.

Figure 4:
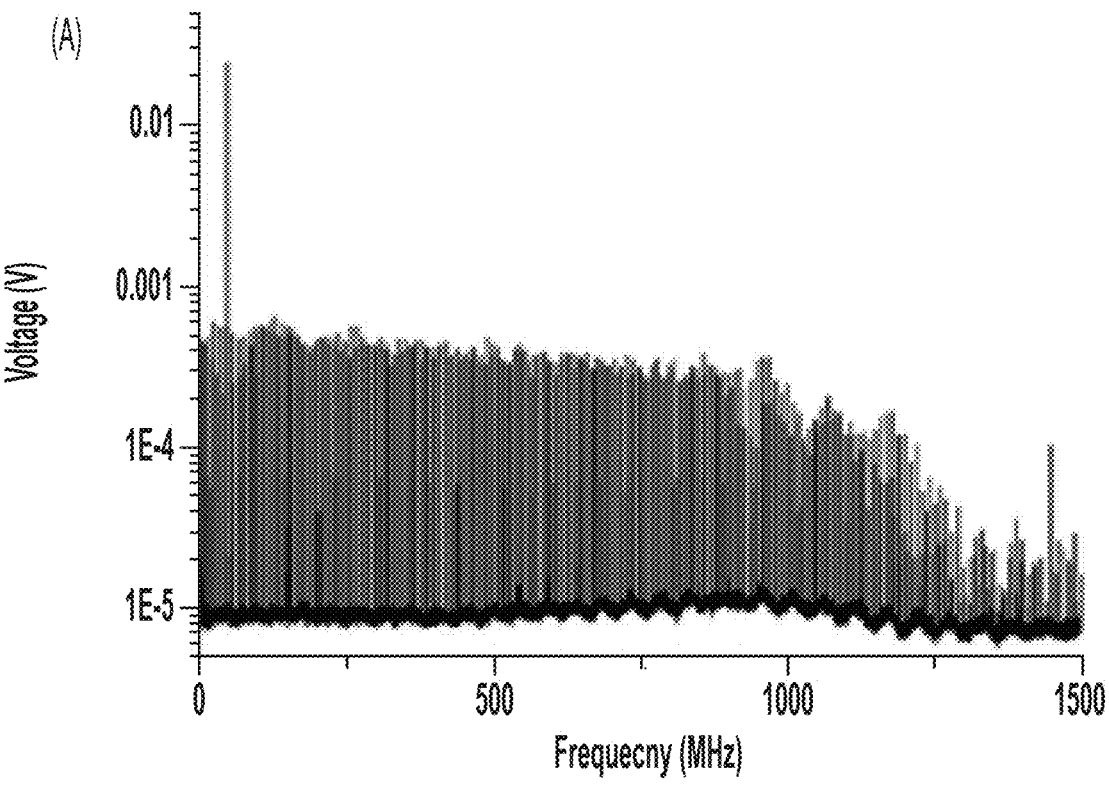
FIG. 4 shows: (a) an optical frequency comb recorded as the average of one hundred 30 kS records. The carrier tone can be seen at 51 MHz as well as the 10 MHz spaced optical frequency comb. (b) Measurement of a normalized optical cavity mode recorded in 1 us and the corresponding Gaussian fit, according to the Example.
Figure 4:
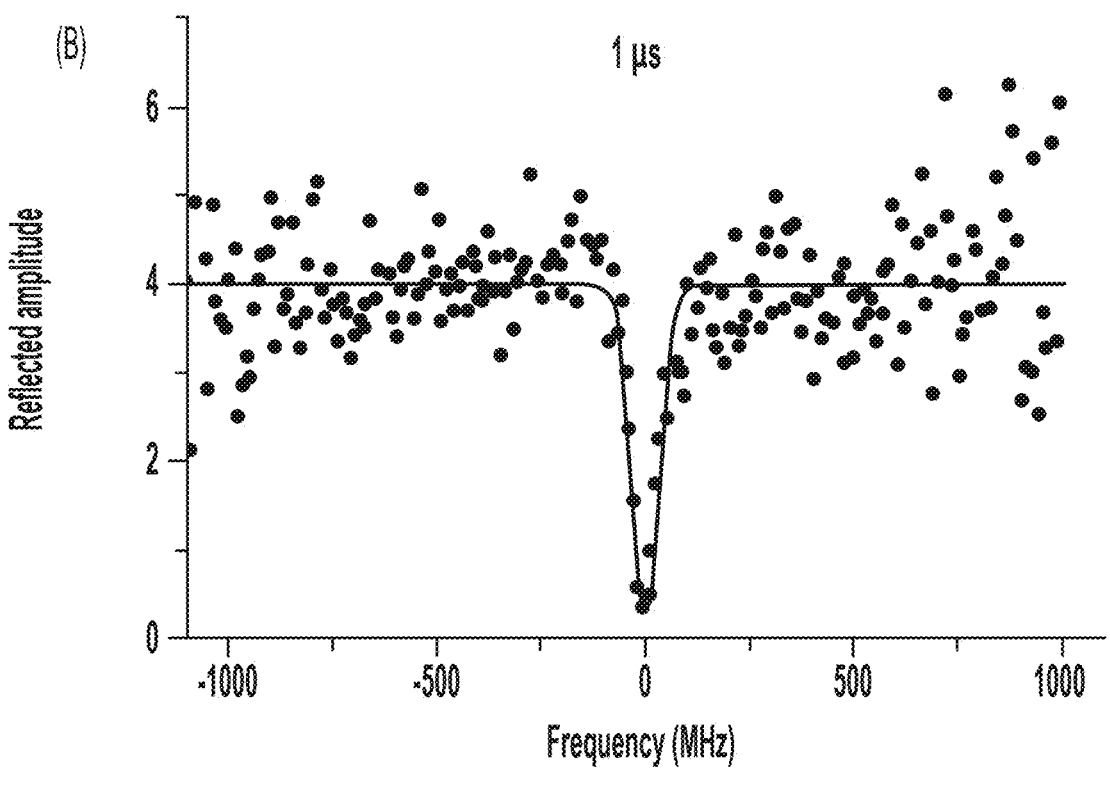

At the low optical power and high bandwidth used for these measurements, there is a fair amount of scatter in each individual cavity spectra, as shown in FIG. 4*b*. Nevertheless, a standard nonlinear fitting routine can reliably determine the center of the cavity mode if we provide an initial value within approximately two linewidths of the resonance center. For many cases, i.e. for small amplitude and/or slower excitations, we could tolerate a measurement bandwidth reduction in order to improve the noise by increasing the number of samples in each sub-interferogram. Since this only requires changing a post-processing parameter, the tradeoff between bandwidth and noise can be easily tuned for each dataset. Furthermore, although we limited the optical power for the results presented here to avoid damage to our cavity, increasing the optical power could also reduce the noise.

In absence of external mechanical excitation, the standard deviation of the resulting fitted center frequencies was generally near 2 MHz with 1 us time resolution, corresponding to a noise-equivalent displacement of 6 fm/$\sqrt{\text{Hz}}$. The processed data yields a 0.5 s long time-domain measurement of the displacement of the mechanical resonator in the optomechanical sensor with a 500 kHz bandwidth. We note that readily available data streaming approaches could be employed to increase this maximum time length to arbitrary lengths and field-programmable-gate-array-based processing could enable real-time analysis, obviating the need for post-processing.

Locking a laser to the side of an optical resonance provided high precision when measuring the thermomechanical noise of the mechanical resonator, but the dynamic range was very low due to the limited linear region of the cavity resonance. This approach also required a priori knowledge of the local cavity resonance slope which can limit the resulting accuracy of the acceleration measurement. Additionally, the laser lock used in this previous work operated with a low-bandwidth feedback controller such that low-frequency motion is nulled out by the controller while motion outside of the controller bandwidth results in a change in the reflected light from the cavity. As a result, it was not possible to measure displacement of the mechanical resonator within these two frequency bands simultaneously. The electro-optic frequency comb readout overcomes these challenges.

To examine the dynamic measurement capabilities of the comb readout, two different types of shaker tables were used to excite the optomechanical accelerometer: a piezoelectric shaker table and an electromechanical shaker table with a voice coil actuator (subsequently referred to here as the mechanical shaker). First, we used the piezoelectric shaker to demonstrate the wide dynamic range of the electro-optic frequency comb readout method over four orders of magnitude of excitation, beyond what is possible with a laser locking readout method.

Figure 5:
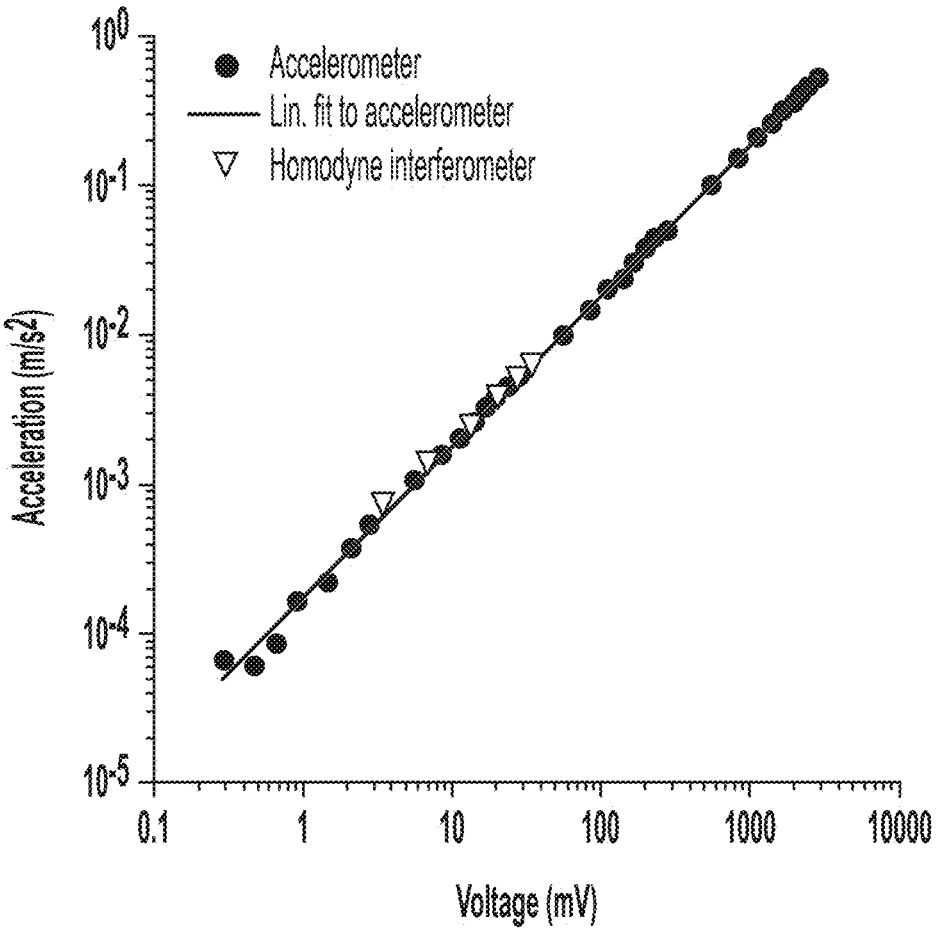
FIG. 5 shows a graph of acceleration versus voltage for root-mean-square acceleration as a function of piezoelectric shaker table drive voltage for a 4 kHz drive frequency, according to the Example. In addition to the accelerometer measurements, independent measurements based upon a homodyne Michelson interferometer are shown.

The sensor was mounted on the shaker table and driven with a 4 kHz sinusoidal voltage at various amplitudes from 0.3 mV to 3 V. As can be seen in FIG. 5, the accelerometer is extremely linear over this very wide range with a standard deviation of the linear fit residuals of $9.6 \times 10^{-4}$ m/s$^2$ and a maximum deviation of only 0.4% of the full measurement range. Though this data includes some contributions from nonlinearities in the piezoelectric actuator, the shaker can be linear over the small voltage range used here. The roll-off of this linearity plot at the lowest drive amplitudes is due to the presence of thermomechanical noise. The maximum excitation voltage used here is 40 times greater than was possible with conventional locking methods, wherein the electro-optic frequency comb readout can change what measurements are possible with cavity optomechanical systems. In addition, the highest voltage used in this linearity measurement was limited by the available shaker drive source rather than the comb readout method which could record displacements a factor of five larger.

A HeNe-based homodyne Michelson interferometer measured the acceleration of a mirror mounted on the top of the accelerometer package. As can be seen in FIG. 5, there was agreement between the accelerations measured with the comb-based-readout of the optomechanical sensor and the homodyne interferometer. Over the voltage range of the homodyne interferometer measurements, the acceleration per drive voltage of the two measurements were within 6%.

Figure 6:
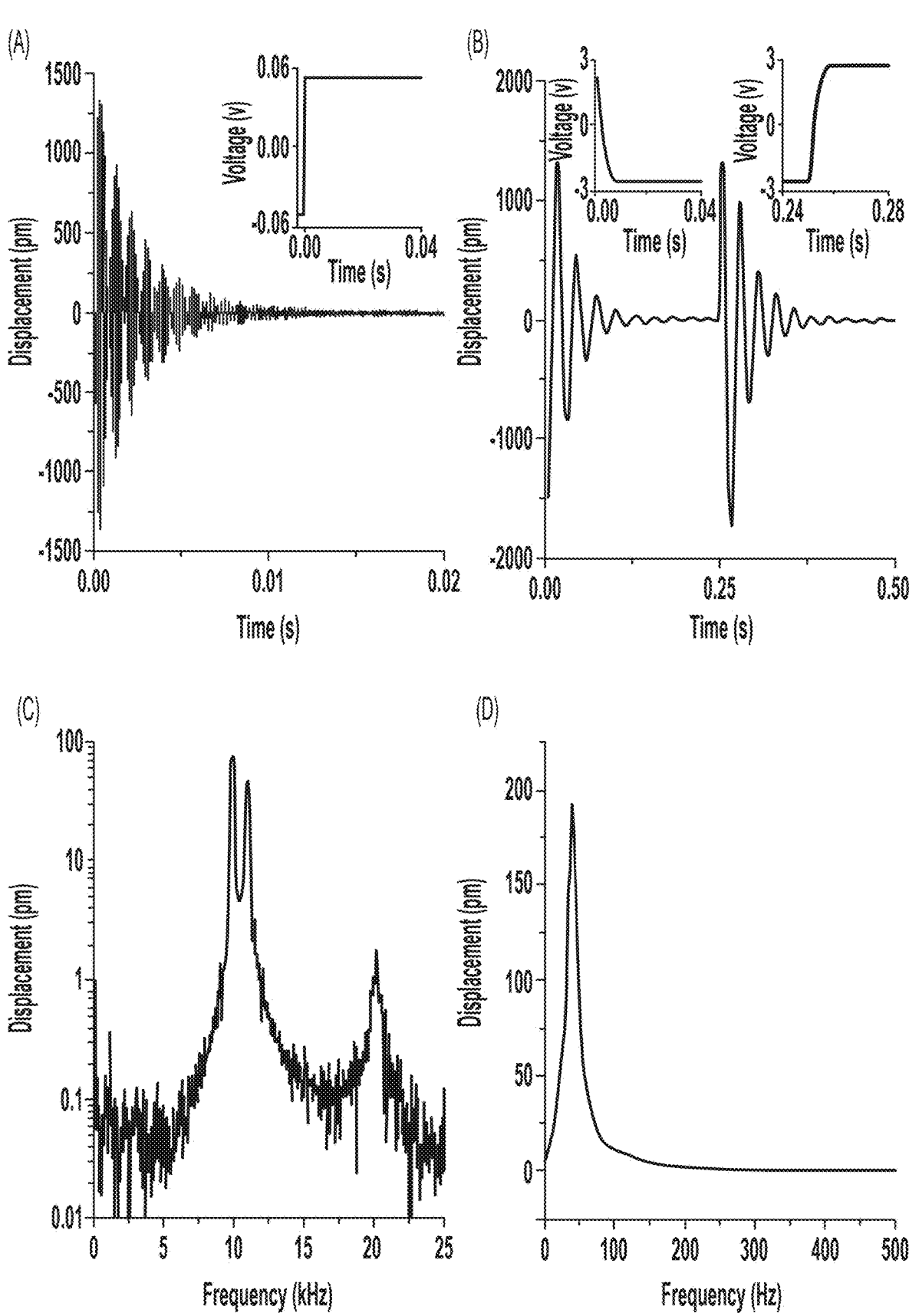
FIG. 6 shows, according to the Example: (a) displacement of the optical cavity within the accelerometer due to an unfiltered square-wave excitation to the piezoelectric shaker (inset). (b) Displacement of the mechanical resonator in the accelerometer due to a low-frequency excitation via a square-wave that has been low-pass filtered with a 100 Hz cutoff frequency using a 12 db/octave Bessel filter (see insets) and the electromechanical shaker. (c) and (d) Corresponding power spectra of the time domain traces shown in (a) and (b), respectively. In panel (c), the mechanical resonance of the accelerometer can be seen at 10 KHz as well as mechanical resonances of the piezoelectric shaker at 11 kHz and 20 kHz, while a far slower mechanical resonance can be observed in panels (b) and (d).

The accelerometer response was measured with two different types of square-wave excitations. When mounted on the piezoelectric shaker table, a square-wave voltage was used with a period of 0.5 s to generate a fast step excitation and ring-down of the mechanical resonances, as shown in the time domain in FIG. 6*a* and frequency domain in FIG. 6*c*. The accelerometer resonance is visible near 10 kHz as well as the mechanical resonances of the shaker at 11 KHz and 20 kHz.

Subsequently the accelerometer was placed on the mechanical shaker to examine its low frequency response. When the driving square-wave voltage was low-pass filtered at 100 Hz (i.e., well below the mechanical resonance of the accelerometer), a much slower time domain response was measured (FIG. 6*b* and FIG. 6*d*) that shows the change in direction of the step excitation within one period.

The comb readout can be used to measure large amplitude dynamic behavior at slow and fast time scales simultaneously. The accelerometer was mounted horizontally on a stainless-steel block that had a polytetrafluoroethylene coating on the bottom surface to provide low friction. The block was struck on the side opposing the accelerometer with a handheld force transducer which provided a trigger signal.

Figure 7:
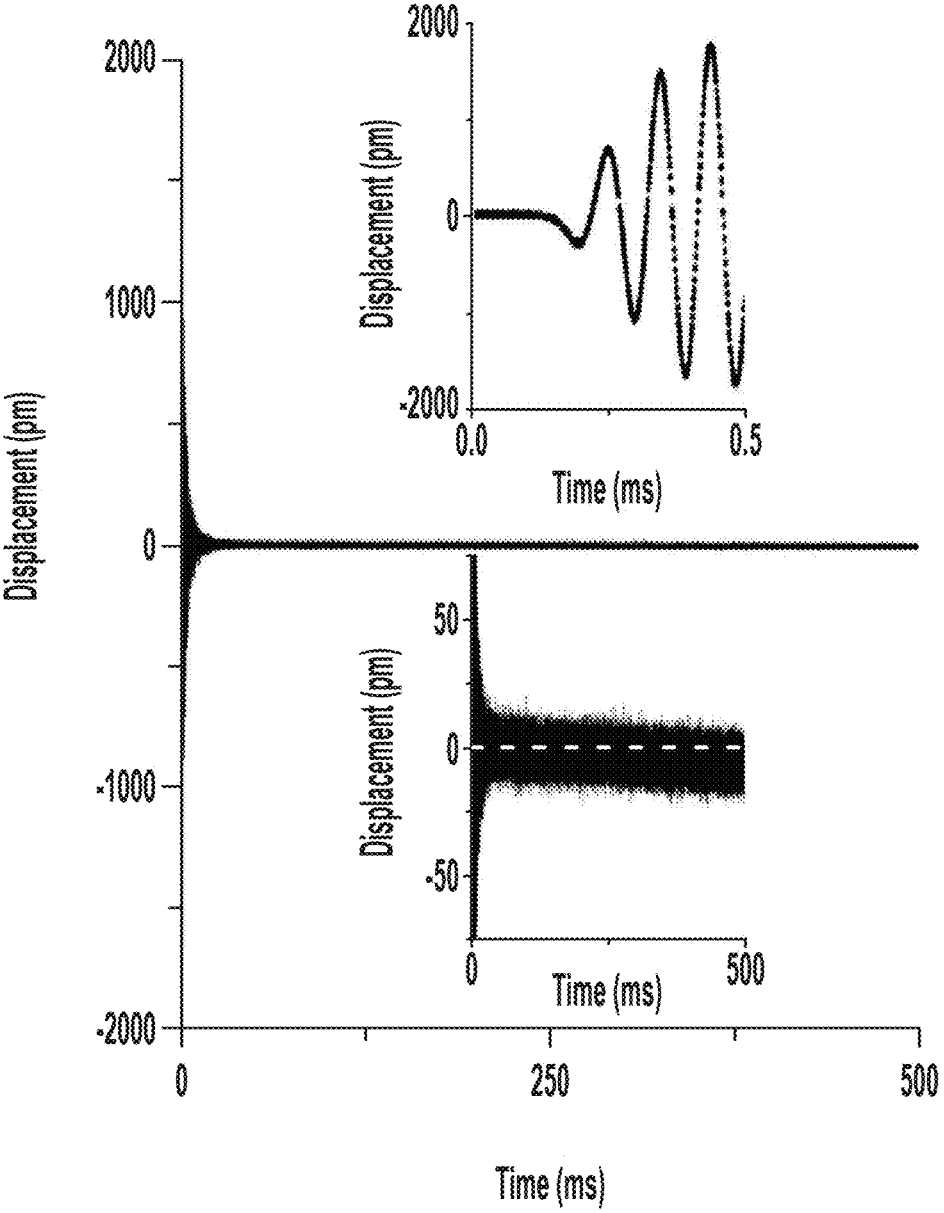
FIG. 7 shows, according to the Example, displacement of the mechanical resonator following excitation with a hand-held force transducer, wherein the accelerometer was mounted on a stainless-steel block with a low-friction bottom surface. The main panel shows mechanical ringdown of the cavity due to the impulse. The upper inset shows the initial oscillations of the cavity following the impulse, which occurred at time zero. The measurement rate was 1 MHz, allowing for the rapid, large oscillations to be quantified with high fidelity. The lower inset reveals the slow near-DC cavity displacement resulting from the impact.

FIG. 7 shows the rapid, large cavity oscillations induced by the sudden impulse. During this initial impulse the cavity displacement is as large as 3.5 nm which corresponds to a motion of twenty-four cavity linewidths (1.8 GHZ) with a period of only 100 us (i.e., the period of the mechanical resonance). To the best of our knowledge, measurements with a laser locking system that can track this level of frequency change and slew rate have never been demonstrated. In addition to these rapid oscillations, the electro-optic comb readout also allows for the quantification of near-DC motion which is normally unobservable as it commonly lies within a cavity lock's servo bandwidth or requires a more difficult and harder-to-interpret in-loop measurement. In the lower inset, we can observe a gradual displacement of the mechanical resonator over timescales out to 0.5 s.

Figure 8:
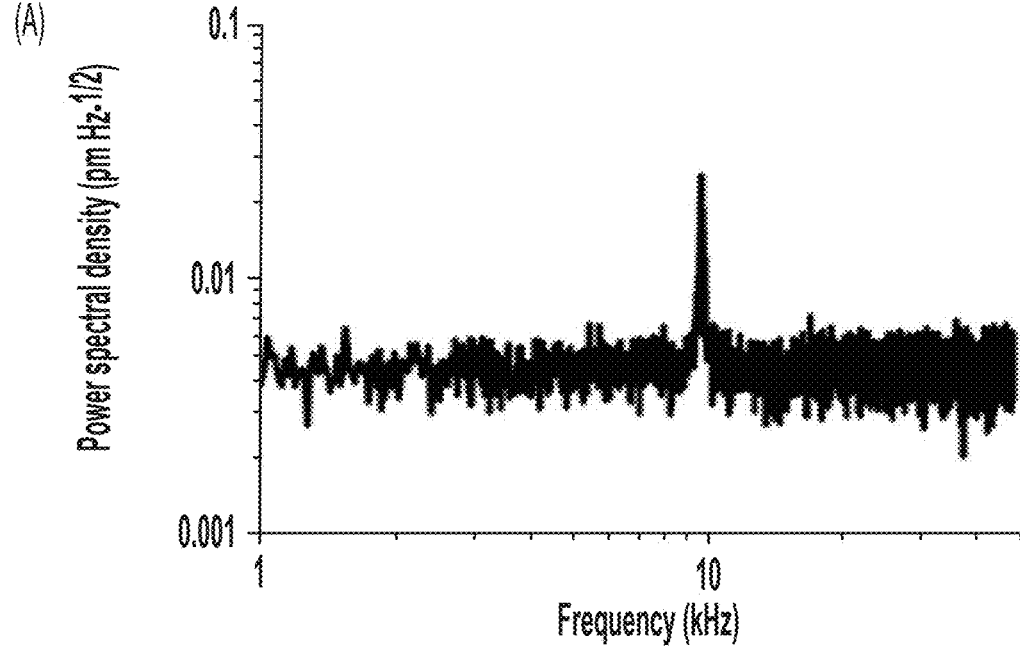
FIG. 8 shows, according to the Example: (a) noise power spectral density, wherein the thermomechanical noise resonance is visible near 10 KHz. (b) Corresponding overlapped Allan deviation.
Figure 8:
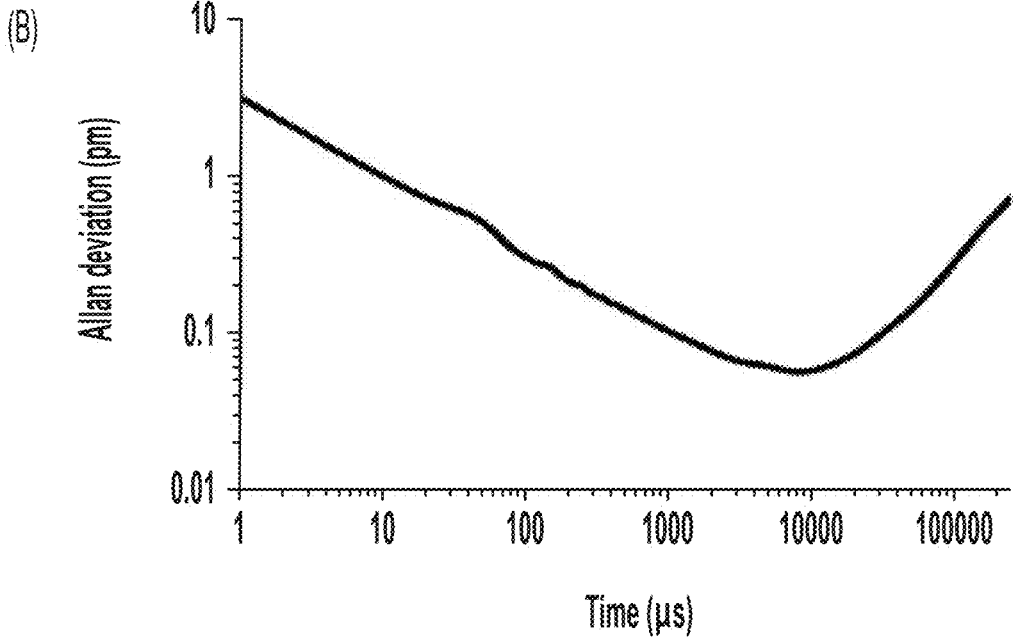

The limits of noise and stability were explored when the accelerometer was located on a vibration isolation platform within an acoustic enclosure. The power spectral density of the measured time-series data is shown in FIG. 8*a*, where the thermomechanical noise of the mechanical resonator is clearly observed and has an amplitude on resonance of 25 fm/√Hz. The total optical power incident on the cavity was only 310 UW with each individual comb tooth having a power near 1 μW. Thus, the shown noise floor of 6 fm/√Hz was achieved with only 8 μW of incident optical power within the cavity's full-width at half-maximum. The ability to operate at low intracavity power levels is advantageous to limit intracavity heating and thus bias instability in optical microcavities.

Using the same time series data, the overlapped Allan deviation was also calculated, as shown in FIG. 8b. This stability measurement is difficult to make with a traditional laser lock readout because the controller generally nulls out the quasi-static motion of the cavity or requires an in-loop measurement. Further, the controller can increase the instability due to added noise.

The optical sensor readout provides rapid and high-dynamic-range interrogation of optical cavities. Electro-optic frequency combs readout optomechanical devices and simultaneously quantify a cavity's length, finesse, coupling efficiency and the presence of any interfering or interacting transverse modes that are aspects of cavity optomechanical systems that may vary dynamically. Further, the use of a direct digital synthesis radiofrequency source reduced cost in a small footprint. Optics and electronics can be assembled in a portable rack-mounted system for mobile, robust operation. The optical sensor readout overcomes limitations of conventional laser locking approaches and is applicable for physical and chemical measurements with cavity optomechanical sensors as well as vibrometry and interferometry.

To generate raw data using the electro-optic frequency comb and to process it into the final output, the optical comb is generated with a span of 2 $f_1$ and spacing of $f_{rep}$. The optical sensor readout shown in FIG. 3 generated an interferogram with a sampling frequency of $f_S$. We subdivide the full file into many sub-interferograms, each consisting of $N_{FFT}$ samples. We take the Fourier spectrum of each of these sub-interferograms, normalize the amplitude using a reference file, and extract only the frequencies that correspond to each of the comb teeth. The resulting spectrum is then fit to extract the center frequency and the process is repeated for the next sub-interferogram. This section will describe each of these steps in more detail.

The optical comb is generated by driving a high-bandwidth electro-optic phase modulator with a train of linear frequency chirps. The chirps are repeated with a frequency of $f_{rep}$ and each of them has the form $$V(t) = A\sin\left(2\pi\left[f_0 t + f_{rep}\frac{(f_1 + f_0)t^2}{2} + \phi\right]\right),$$

where A is a constant amplitude, $f_0$ and $f_1$ are the start and stop frequencies of the chirp, and φ is a constant phase term. The amplitude is selected to be approximately $V_\pi/4$ so that the EOM first-order sidebands form a frequency comb and there is negligible optical power in the second-order sidebands. We set $f_0=f_{rep}$ so that we have a continuous comb spanning from $-f_1$ to $f_1$, relative to the optical carrier, with a spacing of $f_{rep}$. This approach gives the user a great deal of flexibility to tailor the comb resolution and span to the requirements of their particular application. However, in order to avoid spectral leakage, the comb tooth spacing should be chosen to ensure that it lies on the grid of frequencies after performing the fast Fourier transformation (FFT) on each sub-interferogram, i.e. $f_{rep}=k \ f_s/N_{FFT}$, where k is a positive integer.

The laser frequency in the local oscillator arm of the interferometer is shifted by an acousto-optic modulator (AOM) in order to perform self-heterodyne detection. Assuming $f_{AOM}$ is small compared to $f_1$, the available comb span is nearly double the largest rf frequency detected by the photodiode, which relaxes the bandwidth requirements of the sampling electronics. Although the exact AOM frequency is not critical, $f_{AOM}$ should be selected such that the negative-order EOM sidebands that are reflected about DC are not coincident with the positive-order sidebands, i.e. $f_{AOM}=k \ f_{rep}/2$. The $f_{AOM}$ can be chosen so that it is also a multiple of the Fourier grid spacing, i.e., $f_{AOM}=k \ f_s/N_{FFT}$.

In addition to the parameters discussed in the previous section, the inputs to the data processing procedure are two data files generated by the digitizer that are the reference and probe interferograms. The reference interferogram is collected while bypassing the optical cavity and is used to normalize the amplitude of the comb spectrum. The optical power used to acquire the reference signal is adjusted using a variable attenuator to match the light level returned from the cavity. Typically, we only take one reference interferogram per day or each time an adjustment is made to a comb parameter and/or the optical power level in either interferometer arm. We did not observe a benefit to collecting a reference signal immediately before each probe signal.

First, the full interferograms are split into sub-interferograms of length $N_{FFT}$. This length should be chosen such that the measurement bandwidth, $fs/(2N_{FFT})$, is much larger than the dynamics of the cavity response to avoid "blurring" of the cavity line due to motion during the sampling time. The ith sub-interferogram will be denoted as $r_i(t)$ and $p_i(t)$ for the reference and probe respectively. Next, we obtain the normalized frequency domain spectrum by calculating $$n_i(f) = \frac{|fft\{p_i(t)\}|^2}{|fft\{r_i(t)\}|^2},$$

where fft{ } denotes the discrete fast-Fourier transformation and the spectral amplitudes are squared to account for the heterodyne nature of the detection scheme.

We next extract just the points in $n_i(f)$ that correspond to the comb teeth, i.e. the values that occur at frequencies $f_{AOM}+m \ f_{rep}$ and $|f_{AOM}-m \ f_{rep}|$ for positive and negative comb teeth respectively where m is an integer that spans from 1 to $f_1/f_{rep}$. It may be necessary to drop comb teeth that occur close to DC since the signal at low frequencies is typically attenuated by high-pass filters in the rf electronics. Then, we center the spectrum by shifting the values down in frequency by $f_{AOM}$ and re-ordering the negative comb teeth such that the spectrum goes from $-f_1$ to $f_1$. Finally, we fit the spectrum to an appropriate cavity lineshape function and extract the center frequency or other parameters of interest. This process is then repeated for each subsequent sub-interferogram until we have built up the record of cavity center frequency as a function of time during the entire collection period.

A Gaussian profile was selected. We performed a full fit using all the lineshape parameters (including the amplitude, width, and constant offset terms) once per data file and all subsequent fits use a single free parameter, the center frequency of the lineshape.

At the low optical power and high bandwidth used for these measurements, there is a fair amount of scatter in each individual cavity spectra, as shown in FIG. 4b. A standard nonlinear fitting routine can reliably determine the center of the cavity mode if we provide an initial value within approximately two linewidths of the resonance center. This guess is generated by a minimum-finding algorithm or simply by using the fit results of the previous sub-interferogram.

The algorithm was implemented in parallel processing. Each raw data file is collected with a sampling rate of 3 GS/s and lasts 0.5 seconds, yielding 500,000 sub-interferograms with $N_{FFT}$=3000. The file is subdivided into groups of 5000 sub-interferograms and the groups are computed in parallel. The entire process, which consists of reading nearly 6 GB of data into memory, performing one million fast-Fourier transforms, 0.5 million curve fits, and saving the results to an output file, takes approximately 30 s on a 28-core personal computer. We note that readily available data streaming approaches could be employed to increase this maximum time length to arbitrary lengths and the processing time could be significantly reduced through the use of field-programmable gate arrays and/or machine learning techniques.

The processed data yields relative cavity mode shifts in units of frequency ($\delta v$). To calculate the cavity displacement, $\delta L$, corresponding to these frequency shifts, we use the relation $$|\delta L| = \left| \frac{\delta v L}{v} \right| = \left| \frac{\delta v c}{2 v v_{FSR}} \right|,$$

where L is the cavity length and the absolute laser frequency on resonance, v, and the free spectral range, $v_{FSR}$, are measured using a wavemeter.

The optomechanical accelerometer used in these measurements features a simple dynamical response that can be well modeled by one-dimensional viscously-damped harmonic oscillator. This allows us to convert between a measured displacement amplitude, $x(\omega)$, and acceleration amplitude, $a(\omega)$, as a function of the angular excitation frequency, w, using the equation $$a(\omega) = x(\omega) \sqrt{(\omega_0^2 - \omega^2)^2 + \left( \frac{\omega_0 \omega}{Q} \right)^2},$$

where $\omega_0$=2TT $f_0$, $f_0$ is the mechanical resonance frequency, and Q is the quality factor. The values of $f_0$=9.852 kHz and Q=99 were determined from the device's thermomechanical noise spectrum.

Figure 9:
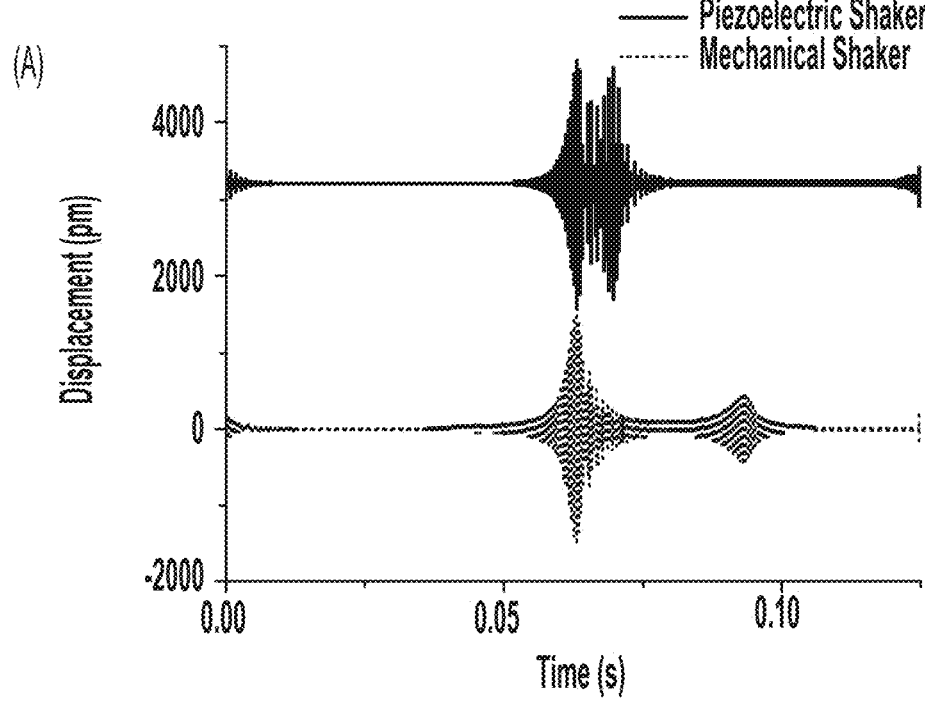
FIG. 9 shows, according to the Example: (a) displacement of the mechanical resonator due to a frequency-chirped excitation that spans from DC to 20 kHz with a repetition rate of 8 Hz for a piezoelectric shaker and a mechanical shaker. The piezoelectric shaker trace was vertically offset by 3200 pm for clarity. (b) Corresponding power spectrum of the measurement in (a). The mechanical resonance of the accelerometer can be seen near 10 KHz. In addition, resonances were due to the piezoelectric shaker at 11 kHz and 20 KHz and the mechanical shaker at 16 KHz.
Figure 9:
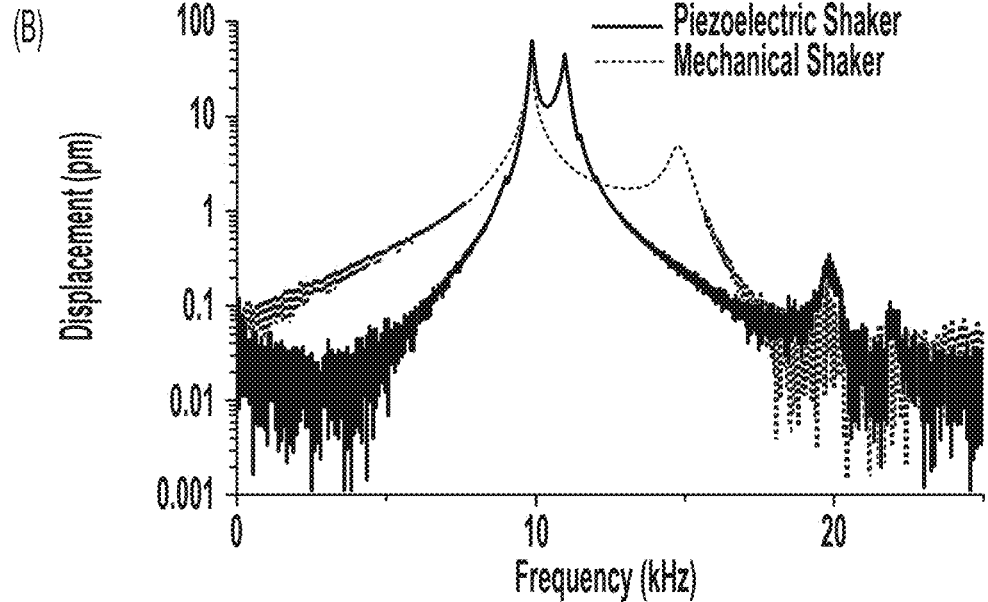

Frequency-chirped drive voltages were employed. The time-domain and frequency-domain results for a chirped signal going from DC to 20 KHz are shown in FIG. 9. This data reveals the mechanical resonances of both the accelerometer and the two different shaker tables, where the fundamental accelerometer resonance appears in both spectra at 9.8 kHz. While laser locking readout methods can be used to capture this type of frequency response, the excitation must be kept small to remain within the linear response of the lock and to avoid breaking the lock, thus limiting the resulting signal-to-noise ratio (SNR) and the ability to study dynamics at physically relevant amplitudes.

Figure 10:
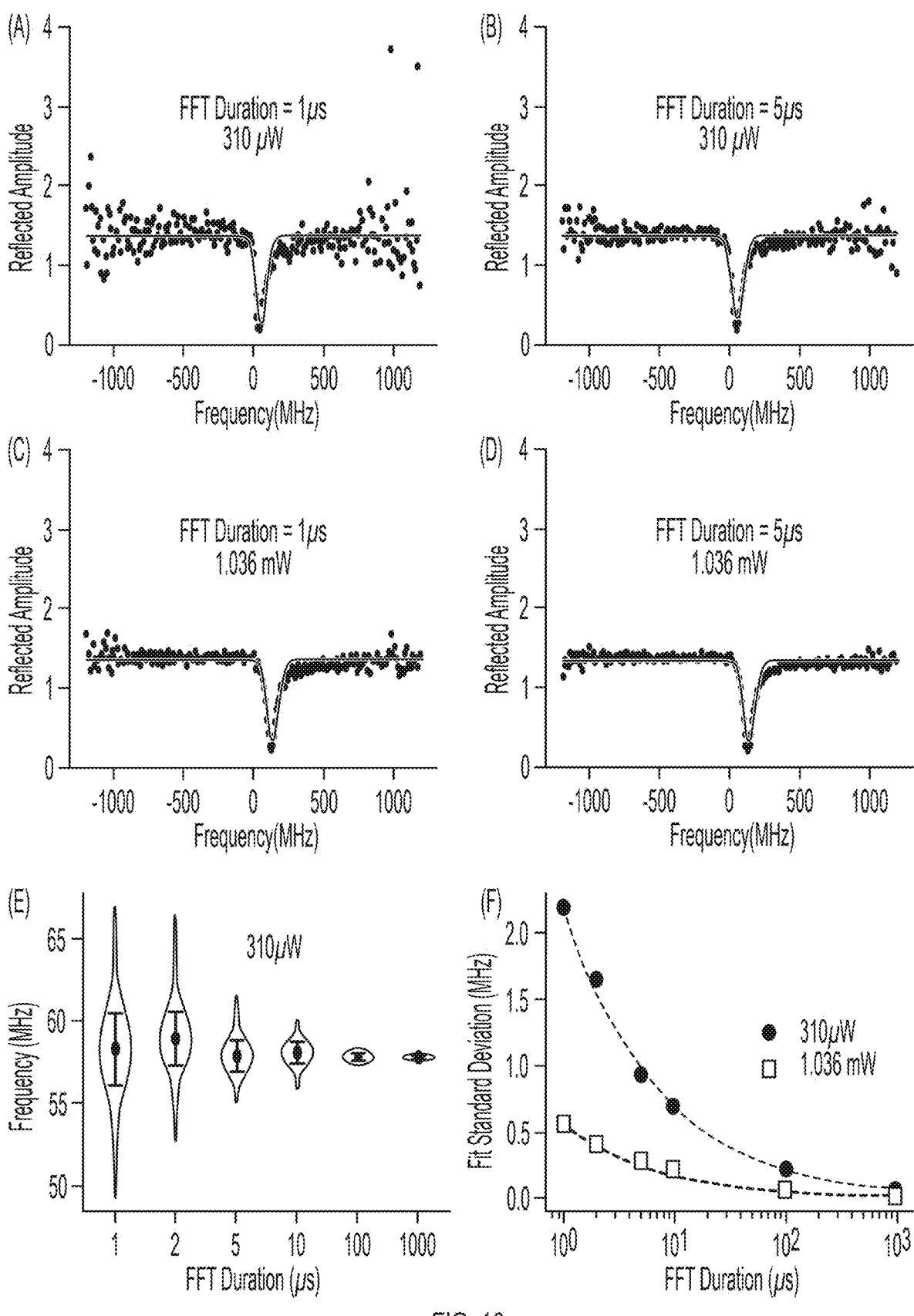
FIG. 10 shows, according to the Example: (panels a, b, c, d) measurements of the normalized optical cavity spectrum and the corresponding Gaussian fit without mechanical excitation. The optical power incident on the cavity was 310 μW for (a) and (b) and 1.036 mW for (c) and (d). The Fourier transform length was 3000 samples (1 μs) for (a) and (c) and 15,000 samples (5 μs) for (b) and (d). (e) Violin plot showing the spread in the position of the fitted Gaussian center for a dataset lasting 10 ms without mechanical excitation and using 310 μW of power at different FFT durations. The points and error bars indicate the mean and standard deviations of each population while the shaded region show a kernel density estimate to illustrate the data distribution. (f) Standard deviations of the measured mode center for the same data shown in (e) (black) as well as for a similar dataset at 1.036 mW optical power (red). The dashed lines show the expected $1/N_{FFT}$ scaling.

The EOM optical comb technique can perform measurements rapidly (sampling frequency of 1 MHz) with low optical power (only a few hundred μW of optical power incident on the cavity). However, by slightly lowering the measurement rate or increasing the optical power, it is possible to reduce the measurement noise. FIG. 10 compares a sample spectrum generated with no mechanical excitation at $N_{FFT}$=3000 (1 μs of averaging time) to a sample spectrum with $N_{FFT}$=15,000 (5 μs of averaging time). FIG. 10e shows the distribution and average of the Gaussian fitted center for a 10 ms dataset. At longer averaging time, the SNR of each spectrum increases which narrows the spread of the fitted results. Since there was no mechanical excitation during this dataset, we expect that the fitted center should be stationary. As the FFT duration increases, the average resonance position remains constant, showing that the apparent noise does not cause a systematic shift. FIG. 10f shows that the standard deviation of the fit center decreases with a $1/N_{FFT}$ scaling. Increasing the averaging time is a good approach for lower amplitude and/or slower excitations when lower measurement bandwidth is possible. Since $N_{FFT}$ is a post-processing parameter, one can easily vary the FFT duration depending on the measurement bandwidth and SNR requirements of a particular measurement.

The optical power was low for nearly all the performed with the optical cavity sensor to avoid damage to the device due to the buildup of large optical power densities within the cavity and also to show operation at reduced optical power levels. FIG. 10(c) and FIG. 10(d) illustrate sample optical spectra using 1.036 mW of power incident of the cavity, which has significantly less scatter compared to the spectra in FIG. 10(a) and FIG. 10(b) in which a third of the optical power was used. These results illustrate that the SNR of this technique can generally be improved by increasing the optical power if it is possible to do so without risking damage to the optical device or saturating the detector. At the reduced noise levels, finer details of the optical spectrum, such as the asymmetry of the cavity mode, are visible.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions.

In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix(s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. An optical sensor readout for interrogating an optical sensor, the optical sensor readout comprising:

a microcavity sensor that receives an optical frequency comb, produces a post-sensor optical frequency comb from the optical frequency comb based on a physical perturbation subjected to the microcavity sensor, and communicates the post-sensor optical frequency comb to a photo detector;

an electro optic modulator in optical communication with the microcavity sensor and that receives input light and a radiofrequency drive signal, produces the optical frequency comb from the input light based on the radiofrequency drive signal, and communicates the optical frequency comb to the microcavity sensor; and the photo detector in optical communication with the microcavity sensor and that:

receives the post-sensor optical frequency comb from the microcavity sensor;

receives a frequency shifted light; and produces a radiofrequency interferogram from interference between the post-sensor optical frequency comb and the frequency shifted light, such that the radiofrequency interferogram includes information to determine the physical perturbation subjected to the microcavity sensor.

2. The optical sensor readout of claim 1, further comprising an acousto optic modulator in optical communication with the photo detector and that receives the input light, produces the frequency shifted light, and communicates the frequency shifted light that is received by the photo detector.

3. The optical sensor readout of claim 1, further comprising an optical attenuator in optical communication with the photo detector and that receives the optical frequency comb, produces attenuated optical frequency comb from the optical frequency comb, and communicates the attenuated optical frequency comb, wherein the attenuated optical frequency comb is combined with the post-sensor optical frequency comb from the microcavity sensor to form probe light that comprises the attenuated optical frequency comb and the post-sensor optical frequency comb, and the probe light is communicated to and received by the photo detector.

4. The optical sensor readout of claim 3, further comprising an optical switch in optical communication with the electro optic modulator, the optical attenuator, and the microcavity sensor and that receives the optical frequency comb from the electro optic modulator, and switches optical paths for propagation of optical frequency comb to the optical attenuator or to the microcavity sensor.

5. The optical sensor readout of claim 1, further comprising a circulator in optical communication with the photo detector and the microcavity sensor and that receives the optical frequency comb, communicates the optical frequency comb to the microcavity sensor, receives the post-sensor optical frequency comb from the microcavity sensor, and communicates the post-sensor optical frequency comb from the microcavity sensor to the photo detector.

6. The optical sensor readout of claim 1, further comprising a laser in optical communication with the electro optic modulator and the acousto optic modulator and that produces the input light that is received by the electro optic modulator and the acousto optic modulator.

7. The optical sensor readout of claim 1, further comprising an amplifier in communication with the photo detector and that receives the radiofrequency interferogram from the photo detector, produces an amplified radiofrequency interferogram from the radiofrequency interferogram, and communicates the amplified radiofrequency interferogram to a digitizer.

8. The optical sensor readout of claim 7, further comprising a digitizer in communication with the amplifier and that receives the amplified radiofrequency interferogram from the amplifier, and digitizes the amplified radiofrequency interferogram.

9. The optical sensor readout of claim 1, wherein the microcavity sensor comprises a first cavity mirror and a second cavity mirror, such that:

the first cavity mirror receives the post-sensor optical frequency comb from the electro optic modulator and communicates the post-sensor optical frequency comb to a second cavity mirror as intracavity light;

the second cavity mirror is in optical communication with the first cavity mirror and receive the intracavity light;

a portion of the intracavity light is transmitted from microcavity sensor to the photo detector via cavity mirror in a reflectance mode of microcavity sensor or via cavity mirror in a transmission mode of microcavity sensor, and a resonance condition of the microcavity sensor for producing the intracavity light from the optical frequency comb depends on the physical perturbation subjected to the microcavity sensor.

10. The optical sensor readout of claim 1, further comprising a shaker in mechanical communication with the microcavity sensor to provide the physical perturbation to the microcavity sensor.

11. A process for interrogating an optical sensor with an optical sensor readout, the process comprising:

receiving, by a microcavity sensor, an optical frequency comb;

producing, by the microcavity sensor, a post-sensor optical frequency comb from the optical frequency comb;

subjecting the microcavity sensor to a physical perturbation and changing a resonant condition of the microcavity sensor in response to the physical perturbation;

communicating the post-sensor optical frequency comb from the microcavity sensor to a photo detector;

an electro optic modulator in optical communication with the microcavity sensor receiving, by an electro optic modulator, input light and a radiofrequency drive signal;

producing, by the electro optic modulator, the optical frequency comb from the input light based on the radiofrequency drive signal;

communicating the optical frequency comb from the electro optic modulator to the microcavity sensor;

the photo detector in optical communication with the microcavity sensor and that:

receiving, by the photo detector, the post-sensor optical frequency comb from the microcavity sensor;

receiving, by the photo detector, a frequency shifted light; and producing, by the photo detector, a radiofrequency interferogram from interference between the post-sensor optical frequency comb and the frequency shifted light, such that the radiofrequency interferogram includes information to determine the physical perturbation subjected to the microcavity sensor.

12. The process of claim 11, further comprising receiving, by an acousto optic modulator, the input light; producing, by the acousto optic modulator, the frequency shifted light; and communicating the frequency shifted light from the acousto optic modulator to the photo detector.

13. The process of claim 11, further comprising receiving, by an optical attenuator, the optical frequency comb; producing, by the optical attenuator, attenuated optical frequency comb from the optical frequency comb; communicating the attenuated optical frequency comb from the optical attenuator; combining the attenuated optical frequency comb with the post-sensor optical frequency comb from the microcavity sensor to form probe light that comprises the attenuated optical frequency comb and the post-sensor optical frequency comb; and communicating the probe light to the photo detector.

14. The process of claim 13, further comprising receiving, by an optical switch, the optical frequency comb from the electro optic modulator; and switching, by the optical switch, between optical paths for propagation of the optical frequency comb to the optical attenuator or to the microcavity sensor.

15. The process of claim 11, further comprising receiving, by a circulator, the optical frequency comb; communicating, from the circulator, the optical frequency comb to the microcavity sensor; receiving, by the circulator, the post-sensor optical frequency comb from the microcavity sensor, and communicating the post-sensor optical frequency comb from the microcavity sensor to the photo detector.

16. The process of claim 11, further comprising producing, by a laser, the input light; and communicating the input light from the laser to the electro optic modulator and the acousto optic modulator.

17. The process of claim 11, further comprising receiving, by an amplifier, the radiofrequency interferogram from the photo detector; producing, by the amplifier, an amplified radiofrequency interferogram from the radiofrequency interferogram; and communicating the amplified radiofrequency interferogram from the amplifier to a digitizer.

18. The process of claim 17, further comprising receiving, by a digitizer, the amplified radiofrequency interferogram from the amplifier; and digitizing, by the digitizer, the amplified radiofrequency interferogram.

19. The process of claim 11, further comprising, wherein the microcavity sensor comprises a first cavity mirror and a second cavity mirror in optical communication with the first cavity mirror:

receiving, by the first cavity mirror, the post-sensor optical frequency comb from the electro optic modulator;

communicating the post-sensor optical frequency comb from the first cavity mirror to the second cavity mirror as intracavity light;

receiving, by the second cavity mirror, the intracavity light from the first cavity mirror; and transmitting a portion of the intracavity light is from the microcavity sensor to the photo detector via cavity mirror in a reflectance mode of microcavity sensor or via cavity mirror in a transmission mode of microcavity sensor, wherein a resonance condition of the microcavity sensor for producing the intracavity light from the optical frequency comb depends on the physical perturbation subjected to the microcavity sensor.

20. The process of claim 11, further comprising providing, by a shaker in mechanical communication with the microcavity sensor, the physical perturbation to the microcavity sensor.

* * * * *